United States Patent [19]

Dicke et al.

[11] Patent Number: 4,912,193

[45] Date of Patent: Mar. 27, 1990

[54] THERMOTROPIC AROMATIC POLYESTER BASED ON P-HYDROXY BENZOIC ACID, 4,4'-DIHYDROXY DIPHENYL, TEREPHTHALIC ACID, AND ISOPHTHALIC ACID

[75] Inventors: Hans-Rudolf Dicke, Bestwig; Volker Eckhardt; Ludwig Bottenbruch, both of Krefeld, all of Fed. Rep. of Germany

[73] Assignee: Bayer Aktiengesellschaft, Leverkusen, Fed. Rep. of Germany

[21] Appl. No.: 259,742

[22] Filed: Oct. 19, 1988

[30] Foreign Application Priority Data

Oct. 31, 1987 [DE] Fed. Rep. of Germany ....... 3736991

[51] Int. Cl.$^4$ .............................................. C08G 63/60
[52] U.S. Cl. .................................. 528/193; 528/176; 524/601
[58] Field of Search ................. 528/176, 193; 524/601

[56] References Cited

U.S. PATENT DOCUMENTS

| | | | |
|---|---|---|---|
| 3,975,487 | 8/1976 | Cottis et al. | 528/193 |
| 4,536,561 | 8/1985 | Schmidt et al. | 528/193 |
| 4,614,789 | 9/1986 | Dicke et al. | 528/193 |
| 4,764,582 | 8/1988 | Hisgen et al. | 528/193 |

FOREIGN PATENT DOCUMENTS 0060531 3/1982 European Pat. Off. .
3419749 11/1985 Fed. Rep. of Germany .

*Primary Examiner*—Harold D. Anderson
*Assistant Examiner*—T. Mosley
*Attorney, Agent, or Firm*—Connolly and Hutz

[57] ABSTRACT

Thermotropic, fully aromatic polyesters based on p-hydroxybenzoic acid, 4,4'-dihydroxydiphenyl, terephthalic acid and isophthalic acid have exceptionally high dimensional stability under heat. The thermotropic aromatic polyesters are used for the production of moulded articles, filaments, fibres and films.

6 Claims, No Drawings

THERMOTROPIC AROMATIC POLYESTER BASED ON P-HYDROXY BENZOIC ACID, 4,4'-DIHYDROXY DIPHENYL, TEREPHTHALIC ACID, AND ISOPHTHALIC ACID

This invention relates to high molecular weight thermotropic aromatic polyesters with high dimensional stability under heat and good thermoplastic processibility, to a process for the preparations of these polyesters and to their use for the production of moulded articles, filaments, fibres and films.

Thermotropic substances are substances which form liquid crystalline melts. Thermotropic polyesters are well known, see e.g.

F. E. McFarlane et al, Liquid Crystal Polymers II, Contemporary Topics in Polymer Science, Volume 2, Plenum Publishing Corporation, 1977;

W. J. Jackson and H. F. Kuhfuss, J. Polymer Science, Polymer Chem. Ed. 14, 2042 (1976);

W. C. Wooten et al, in A. Ciferri "Ultra-high Modulus Polymers", Applied Science Publ., London 1979, page 362 et sec.;

A. Blumstein et al., "Liquid Crystalline Order in Polymers", Academic Press 1978;

J. Preston, Angew, Makromol, Chem. 109/110, 1–19 (1982);

A. Ciferri, W. R. Krigbaum, R. B. Meyer, "Polymer Liquid Crystals", Academic Press, New York, 1981;

EP-A 1 185, 8 855, 15 856, 17 310, 18 145, 22 344, 44 204, 49 615, 49 617, 53 940, 71 447, 74 700, 92 617, 102 160, 172 849, 187 734 , 191 705;

US-PS 3 991 013, 3 991 014, 4 066 620, 4 083 829, 4 107 134, 4 153 779, 4 279 803, 4 294 955, 4 391 966, 4 529 565, 4 608 429;

WO 79/797, 79/1030, 79/1040.

The liquid crystalline state of polyester melts can be investigated by means of a polarisation microscope. For carrying out such investigations, the eye piece was fitted with an attachment containing a photoelectric diode at the focal point of the eye piece. A measurement amplifier with control device arranged down stream of the eye piece was used to adjust the microscope so that when it was switched on with Nicols Prisms arranged in parallel, the value measured in the absence of a sample of material was 100 scale divisions. The value obtained with crossed Nicols Prisms was then 0.01 scale divisions.

The thickness of the layer of polyester melts investigated was 100 $\mu$m.

The polyesters were investigated after the samples had been melted at temperatures from 300° to 430° C. If the melt between the crossed Nicols Prisms was observed to brighten in this whole region or in a part thereof, the polyester was classified as a liquid crystalline thermotropic substance.

Liquid crystalline polyesters give values above 1 scale division in the measuring arrangement, in most cases values from 3 to 90 scale divisions. Amorphous melts, on the other hand, e.g. aromatic polycarbonates, were found to give values of less than 0.1 scale division.

The method described above is particularly suitable for rapid determination in a laboratory and gives unequivocal results in almost all cases. In cases of doubt, however, it may be advisable to confirm the presence of liquid crystalline components in the melt by wide angle X-ray scattering as described, for example, by g.W. Gray and P.A. Windsor in "Plastic Crystals, Physico-Chemical Properties and Methods of Investigation", in particular Chapter 3, John Wiley and Sons, New York, Sydney, Toronto, 1974.

Thermotropic polyesters can be processed by thermoplastic shaping to give rise to moulded articles and films and can be spun from the melt to produce filaments and fibres with exceptional mechanical properties, provided that the polyesters can be melted without decomposition.

The simplest fully aromatic polyesters, such as poly(4-hydroxybenzoate) and poly-(1,4-phenyleneterephthalate) do not fulfil these conditions; they melt at about 600° C. with decomposition.

Fully aromatic polyesters based on p-hydroxybenzoic acid, aromatic dicarboxylic acids such as isophthalic acid and terephthalic acid and aromatic dihydroxy compounds such as hydroquinone, resorcinol and 4,4'-dihydroxydiphenyl are described in DE-OS 20 25 971. Investigations carried out by the present applicants have shown that some of the compositions mentioned in the examples (see examples 1, 2, 3, 4, 9 and 11) are dimensionally stable at temperatures above 200° C. The temperatures required for processing these dimensionally highly stable polyesters, however, are above 400° C. so that thermoplastic shaping in conventional apparatus is very difficult or even impossible. At the same time, the lower melting compositions mentioned in the examples have dimensional stabilities under heat distinctly below 200° C. Such values for dimensional stability under heat are insufficient for many applications.

Other thermotropic thermoplastically processable polyesters, obtained from three or more monomers have been described (e.g. DE-OS 27 04 315, 27 21 786, 27 51 653, 28 34 537, 28 44 817, 29 32 178 and 29 63 833 and EP-A 1 340, 30 182 and 69 587). All these products have, however, the disadvantage that when the processing temperature is reduced to below 350° C., their dimensional stability in terms of their heat distortion temperature falls to below 200° C. In some cases, this dimensional stability under heat can be increased by a thermal after-treatment of the filaments, fibres, films or moulded articles produced from these thermotropic copolyesters, but this thermal aftertreatment is uneconomical.

It was an object of the present invention to provide thermotropic aromatic polyesters which can be thermoplastically processed without decomposition inspite of their high heat distortion temperature.

The heat distortion temperature, determined as HDT-A (without thermal after-treatment), should be at least 200° C. and is preferably not less than 210° C.

The processing temperature should be below 380° C., preferably below 350° C.

The difference between processing temperature and heat distortion temperature should not be greater than 140° C. and is preferably not greater than 120° C.

It has surprisingly been found that thermotropic polyesters have the desired combination of advantageous properties if they have been synthesises from p-hydroxybenzoic acid, 4,4'-dihydroxydiphenyl, isophthalic acid and terephthalic acid in exactly specified concentration ratios.

This invention therefore relates to thermotropic polyesters containing recurrent units corresponding to the following formulae:

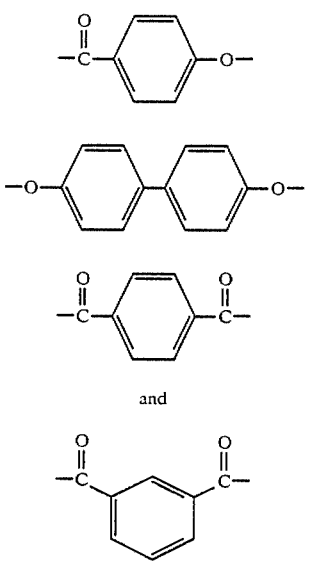

and the units of formula (I) being incorporated in the polyesters by condensation in a quantity of from 74.5 to 77.7 mol %, preferably 75 mol %, and the units of formula (IV) in a quantity from 9.5 to 10.5 mol %, preferably 10 mol %, based in each case on the sum of the condensed units (I), (III) and (IV), and the molar ratio of the condensed units (II)/[(III) +(IV)] being from 0.95 to 1.05.

The polyesters according to the invention may contain the groups of compounds (I) to (IV) in random distribution, in segments or in blocks. As regards component (I), it should be noted that an increase in the length of the blocks produces a sharp increase in the melting point and the melt viscosity.

The polyesters according to the invention may contain —COOH, —OH, —OC$_6$H$_5$, aryloxy or groups derived from chain breaking agents as end groups. The following are preferred chain breaking agents: monofunctional aromatic hydroxyl compounds such as 4-hydroxydiphenyl, p-nonylphenol, 4-(1,1,3,3-tetramethyl-butyl)-phenol and β-naphthol and aromatic monocarboxylic acids such as diphenyl carboxylic acids and naphthalene carboxylic acids. Chain breaking agents may be used in quantities of about 0.1 to 10 mol %, preferably 0.2 to 5.0 mol %, based on dihydroxydiphenyl in the case of monohydroxyl compounds and based on dicarboxylic acids in the case of monocarboxylic acids.

Trifunctional or higher functional, preferably tri- or tetrafunctional monomers, preferably aromatic monomers such as phloroglucinol, 1,3,5-benzene-tricarboxylic acid or 3,5-dihydroxy-benzoic acid may be used as branching agents in quantities of about 0.1 to 2 mol %, preferably 0.2 to 1.0 mol %, based on dicarboxylic acids in the case of poly and hydroxy carboxylic acids and based on diphenols in the case of polyols.

The polyesters according to the invention are insoluble in the solvents which we tested, such as p-chlorophenol and phenol/1,1,2,2-tetrachloroethane (1:1 parts by weight).

The polyesters according to the invention generally have a melt viscosity of less than 1000 Pa.s, preferably 10 to 500 Pa.s, determined at a shear velocity of 10$^3$ sec$^{-1}$, using a nozzle with a length/diameter ratio of 20 at a temperature below 380° C., preferably at 330° to 370° C.

The polyesters according to the invention may be prepared by various methods, e.g. by condensation or transesterification of the hydroxy carboxylic acids, dicarboxylic acids or diphenols derived from the groups I, II, III and IV or their reactive derivative, followed by polycondensation (see e.g. R. W. Lenz, "Synthetic routes to liquid crystalline Polymers" in: Recent Advances in Liquid Crystalline Polymers, Elsevier, New York, 1985).

Examples of preferred methods of synthesis include the reaction of lower acyl esters of compound (I) and (II) with terephthalic acid (III) and isophthalic acid (IV), the acyl esters being optionally prepared in situ, and the reaction of the aryl esters of compounds (I), (III) and (IV) with 4,4'-dihydroxydiphenyl (II), in which the aryl esters may also be prepared in situ.

In a particularly preferred method of synthesis, the lower acyl esters, preferably the acetates, of compounds (I) and (II) are reacted with terephthalic acid (III) and isophthalic acid (IV), the acyl esters being optionally prepared in situ.

The reactions may be carried out in the melt or in inert, high boiling solvents (see e.g. DE-OS 2 025 971).

The residues of the compounds (I) to (IV) are built into the polyesters in the proportions of the starting components.

It may be advisable to catalyse both the condensation and transesterification reactions and the polycondensation reactions. Catalysts for these purposes are known, e.g. Lewis acids and hydrohalic acid; oxides, hydrides, hydroxides, halides, alcoholates, phenolates and salts of inorganic or organic acids (preferably carboxylic acid salts), complex salts or mixed salts of alkaline earth metals such as magnesium or calcium; of sub-group elements such as vanadium, titanium, manganese, cobalt, nickel, zinc, lanthanum, cerium or zirconium or of elements from other groups of the periodic system, such as germanium, tin, lead and antimony, or the alkali metals or alkaline earth metals as such, in particular sodium, sodium hydroxide, lithium acetate, sodium acetate, potassium acetate, calcium acetate, magnesium acetate, cobalt acetate, zinc acetate, calcium benzoate, magnesium acetyl acetonate, zinc acetyl acetonate, vanadyl-C$_1$ to C$_8$-alkoxides, titanium alkoxides such as titanium tetrabutylate, titanium tetrapropylate, alkoxytitanium silicates, zirconium butylate, zirconium propylate, titanium tetraphenolate, sodium phenolate, germanium dioxide, antimony trioxide, dialkyl and diaryl tin oxide, dibutyl tin diacetate and dibutyl dimethoxy tin.

The catalysts are preferably used in quantities of from 0.001 to 1% by weight, in particular from 0.01 to 0.2% by weight, based on the total weight of the monomers used.

The polyesters according to the invention may be prepared at temperatures of about 150° to 380° C. The reaction is generally begun at a low temperature and the temperature is continuously raised as the reaction progresses. When the reaction velocity decreases, a vacuum may be applied, preferably by continuously lowering the pressure from normal pressure to about 0.1 mbar.

The product obtained may be subjected to a solid phase after-condensation, preferably in the form of a granulate, at a reduced pressure and at temperatures of about 200° C. to 300° C., preferably 240° to 280° C.

After 1 to 25 hours, the molecular weight has increased and the properties of the polyester have thereby markedly improved.

The invention further relates to a process for the preparation of the new polyesters, characterized in that the hydroxy carboxylic acids, dicarboxylic acids and diphenols derived from groups I, II, III and IV or the reactive derivatives thereof, which may be prepared in situ, are reacted at temperatures from 150° C. to 380° C., optionally at reduced pressure and optionally in the presence of catalysts, chain breaking agents and branching agents.

As the thermotropic polyesters according to the invention have relatively low melt viscosities, they may advantageously be processed from the melt for the production of injection moulded parts, filaments, fibres, band and films. The shearing forces which occur in the process bring about a molecular orientation which depends to a large extent on the magnitude of the shearing forces. The polyesters show a marked structural viscosity, i.e. the melt viscosity drops sharply with increasing shearing forces. The polyesters may be processed by injection moulding, extrusion, compression moulding and melt spinning.

Moulded parts with excellent rigidity and toughness, very high heat distortion temperatures and great dimensional stability may be produced from the polyesters according to the invention. Since the polyesters are exceptionally chemically resistant and flame resistant, they are particularly suitable for the manufacture of electrotechnical products such as insulators, printed circuits, electric plugs, parts of fittings, and casings for integrated circuits, parts of chemical technical apparatus such as pipes, container linings, rotors, friction bearings and seals, parts of internal fittings of aircraft, and parts of apparatus for medical technology and parts of air conditioning plants and valves.

The polyesters according to the invention may also be used as coating materials (pulverulent or dispersed). They are also eminently suitable for the production of reinforced and/or filled moulding compounds containing from 5 to 65% by weight of a reinforcing substance and/or filler, based on the reinforced and/or filled compound.

The invention also relates to the use of the new polyesters for the production of moulded articles, filaments, fibres and films.

EXAMPLES

The flexural strength was determined on test rods (80 mm×10 mm×4 mm) according to DIN 53 452 (ISO/R 178). The flexural modulus according to DIN 53 457 was determined on the same test samples. The dimensional stability under heat was measured by determining the HDT-A temperature on rectangular rods (80mm×10 mm×4 mm) according to DIN 53 461 (ISO 75) (load: 181.5 N/mm²). The impact strength $a_n$ and notched impact strength $a_k$ were determined according to DIN 53 453 (ISO/R 179) on test rods measuring 80 mm×10 mm×4 mm.

EXAMPLE 1

The following substances were weighed into a 1 litre threenecked flask equipped with stirrer, nitrogen inlet and distillation attachment:
276 g≅2 mol p-hydroxybenzoic acid
44.8 g≅0.27 mol isophthalic acid
66.4 g≅0.4 mol terephthalic acid
124.6 g≅0.67 mol 4,4'-dihydroxydiphenyl
346.2 g≅3.39 mol acetic anhydride
0.045 g magnesium
0.225 g of the potassium salt of hydroquinone sulphonic acid.

The reaction mixture was heated to 170° C. on an oil bath under a nitrogen atmosphere. As soon as the distillation of the acetic acid slowed down (after about 45 minutes), the temperature in the reaction vessel was raised to 230° C. in the course of one hour and then to 300° C. in the course of a further two hours. The pressure was reduced to 0.5 mbar in at this temperature. The vacuum was reduced to 0.5 mbar in the course of 50 minutes and the temperature was at the same time raised to 350° C. The oil bath was then removed and the flask was broken to recover the solidified product. The pale beige polyester obtained was ground and test samples (80 mm×10 mm×4 mm) were produced from it by injection moulding at 350° C. The melt viscosity at 350° C. and at a shear velocity of $10^3$ s$^{-1}$ was found to be 14.1 Pa.s. The mechanical properties measured on the test samples are shown in Table 1.

COMPARISON 1

The following substances were introduced into the apparatus described in Example 1:
275.6 g≅2 mol p-hydroxybenzoic acid
66.4 g≅0.4 mol isophthalic acid
44.8 g≅0.27 mol terephthalic acid
124.6 g≅0.67 mol 4,4'-dihydroxydiphenyl
346.2 g≅3.39 mol acetic anhydride
0.045 g magnesium
0.225 g of the potassium salt of hydroquinone sulphonic acid.

A pale beige polyester was obtained when the temperature/time programme described in Example 1 was employed. The result of melt viscosity measurement and testing of the injection moulded sample are entered in Table 1.

COMPARISON 2

A polyester was prepared from the following starting substances in the apparatus described in Example 1 and by the process described in that Example.
312 g≅2.26 mol p-hydroxybenzoic acid
46.9 g≅0.28 mol isophthalic acid
46.9 g≅0.28 mol terephthalic acid
105.1 g≅0.56 mol 4,4'-dihydroxydiphenyl
352.8 g≅3.46 mol acetic anhydride
0.045 g magnesium
0.225 g of the potassium salt of hydroquinone sulphonic acid.

The test results are listed in Table I.

EXAMPLE 2

The following substances were introduced into a heatable 400 litre tank of V4A steel equipped with stirrer, nitrogen inlet and distillation attachment:
48.99 kg≅355 mol p-hydroxybenzoic acid
7.68 kg≅47.3 isophthalic acid
11.78 kg≅71 mol terephthalic acid
22.22 kg≅119.3 mol 4,4'-dihydroxydiphenyl
61.79 kg≅605.3 mol acetic anhydride
8 g of magnesium
40 g of the potassium salt of hydroquinone sulphonic acid.

The tank was evacuated three times and ventilated three times with nitrogen and then heated to 170° C. Nitrogen was passed over at the rate of 20 litres per hour. After one hour at 170° C., the temperature was raised to 200° C., maintained for 30 minutes and then raised to 250° C. The reaction mixture was then heated to 330° C. and after a further 90 minutes the temperature was raised to 340° C. A vacuum was applied and the pressure in the tank was lowered to 30 mbar in the course of one hour. The tank was then flushed with nitrogen and after the contents had been left to settle for 30 minutes the product was forced out through a valve at the bottom and granulated.

TABLE 1

| | pHB[1] | DOD[2] (mol %) | IS[3] | TS[4] | $a_n/a_k$ (kJ/m$^2$) | Flexural strength (MPa) | Flexural modulus (MPa) | $\eta m$* | HDT-A (°C.) | T processing (°C.) | T** (°C.) |
|---|---|---|---|---|---|---|---|---|---|---|---|
| Example 1 | 75 | 25 | 10 | 15 | 38/15 | 138 | 10.700 | 14.1 | 216 | 350 | 134 |
| Comparison 1 | 75 | 25 | 15 | 10 | 39/16 | 126 | 7.700 | 56.6 | 156 | 350 | 194 |
| Comparison 2 | 80 | 20 | 10 | 10 | 54/23 | 128 | 7.900 | 50.9 | 196 | 350 | 154 |
| Example | | | | | | | | | | | |
| 2a | 75 | 25 | 10 | 15 | 23/17 | 124 | 10.400 | 14.2 | 215 | 350 | 135 |
| 2b | 75 | 25 | 10 | 15 | 37/21 | 141 | 11.100 | 14.2 | 226 | 330 | 104 |
| After-condensed 2c | 75 | 25 | 10 | 15 | 38/19 | 151 | 12.100 | 58.0 | 225 | 340 | 115 |

*measured at 350° C. and a shearing velocity of $10^3 \, s^{-1}$
**T = $T_{processing}$ − HDT-A temperature
[1]pHB = p-hydroxybenzoic acid
[2]DOD = 4,4'-dihydroxydiphenyl
[3]IS = isophthalic acid
[4]TS = terephthalic acid One part of the isolated pale beige polyester was aftercondensed in the solid phase in a vacuum at 250° C. (20 hours).

The values obtained from melt viscosity measurements and the mechanical testing of these products are shown in Table 1.

The examples and the comparison examples clearly confirm that the required properties can only be realised within a very narrow range of concentration ratios. Even a slight increase in the concentration of isophthalic acid units drastically reduces the dimensional stability under heat. An increase in the pHB concentration results in a marked increase in the difference between the processing temperature and the HDT-A temperature.

We claim:

1. Thermotropic, fully aromatic polyester based on
   (I) p-hydroxybenzoic acid,
   (II) 4,4'-dihydroxydiphenyl,
   (III) terephthalic acid and
   (IV) isophthalic acid
the polyester containing the condensed groups (I) in a quantity of from 74.5 to 77.5 mol % and the condensed groups (IV) in a quantity of from 9.5 to 10.5 mol %, based in each case on the sum of the condensed groups (I), (III) and (IV), and the molar ratio of the condensed groups (II)/[(III)+(IV)] being 0.95 to 1.05.

2. Polyester according to claim 1, containing the condensed groups (I) in a quantity of 75 mol % and the condensed groups (IV) in a quantity of 10 mol %, based in each case on the sum of the condensed groups (I), (III) and (IV).

3. Process according to claim 1, followed by a solid phase after-condensation.

4. Process for the preparation of the polyester according to claim 1 wherein esters of compounds (I) and (II) are reacted at temperatures from 150° to 380° C. with terephthalic acid (III) and isophthalic acid (IV) at atmospheric pressure or lower, optionally in the presence of chain terminating agent, branching agent and catalyst.

5. Moulded article, filament, fiber or film which contain the polyester as claimed in claim 1.

6. A moulding composition comprising the polyester as claimed in claim 1 and 5 to 65% by weight of the composition of a reinforcing agent or filter or both.

* * * * *